United States Patent [19]

Boardman

[11] 4,268,558

[45] May 19, 1981

[54] THERMAL STORAGE MATERIAL AND PROCESS FOR MAKING

[75] Inventor: Bryan J. Boardman, Chadds Ford, Pa.

[73] Assignee: Boardman Energy Systems, Inc., Wilmington, Del.

[21] Appl. No.: 95,462

[22] Filed: Nov. 19, 1979

Related U.S. Application Data

[63] Continuation-in-part of Ser. No. 812,420, Jul. 1, 1977, abandoned.

[51] Int. Cl.³ ............................ B32B 5/18; B05D 7/00; F24H 7/00
[52] U.S. Cl. ........................................ 428/71; 126/400; 165/104 M; 165/DIG. 8; 165/DIG. 10; 427/215; 427/216; 427/402; 428/310; 428/311; 428/312; 428/403; 428/407; 428/913
[58] Field of Search .................. 126/400; 165/104 M, 165/DIG. 8, DIG. 10; 428/310, 311, 312, 304, 403, 404, 406, 913, 71, 68, 76; 252/70, 71; 427/216, 215, 402

[56] References Cited

U.S. PATENT DOCUMENTS

| | | | |
|---|---|---|---|
| 2,515,298 | 7/1950 | Feldman | 126/204 |
| 3,104,196 | 9/1963 | Shannon | 428/407 |
| 3,451,841 | 6/1969 | Kesten et al. | 428/311 |
| 3,451,842 | 6/1969 | Kurz et al. | 428/425 |
| 3,616,172 | 10/1971 | Rubens | 428/322 |
| 3,653,170 | 4/1972 | Sheckler | 428/312 |
| 3,660,144 | 5/1972 | Kucsma et al. | 428/312 |
| 3,720,198 | 3/1973 | Laing et al. | 126/400 |
| 3,930,085 | 12/1975 | Pasiuk | 428/312 |
| 3,978,269 | 8/1976 | Martin | 428/403 |
| 3,986,969 | 10/1969 | Telkes | 126/400 |
| 4,002,788 | 1/1977 | Lott | 428/311 |
| 4,107,376 | 8/1978 | Ishikawa | 428/306 |
| 4,122,231 | 10/1978 | Kishi | 428/310 |
| 4,175,158 | 11/1979 | Saunders | 428/403 |

FOREIGN PATENT DOCUMENTS

| | | | |
|---|---|---|---|
| 1266249 | 3/1972 | United Kingdom | 428/311 |
| 1357346 | 6/1974 | United Kingdom | 428/311 |

*Primary Examiner*—William J. Van Balen
*Attorney, Agent, or Firm*—John G. Abramo

[57] ABSTRACT

A thermal storage structure and process for making the same comprising a base material of a substantially open cell structure, with the pores interconnected and open to the surface. The open cell structure may be a volcanic rock or alternatively may be a synthetically made structure such as foamed glass, foamed concrete or foamed metal. The open cell material is completely saturated with a latent heat storage component such as a salt-hydrate or eutectic salts. In the process of making the latent heat storage structure, the latent heat storage component is melted in a container and the open cell structure is placed therein, whereupon the melt is spontaneously imbibed by the structure, replacing the air in the open cell structure with the liquid latent heat storage component. The structure, after cooling, is packaged or encapsulated with a vapor impermeable material. In a preferred embodiment of foamed glass material, the structure is sealed in an aluminum foil, and in an alternative embodiment, the foamed aluminum material is sealed with an aluminum foil.

24 Claims, No Drawings

THERMAL STORAGE MATERIAL AND PROCESS FOR MAKING

This is a continuation-in-part of my application, Ser. No. 812,420, filed July 1, 1977, now abandoned.

BACKGROUND OF THE INVENTION

Field of the Invention

Thermal energy storage systems are a means for storing energy during certain periods to provide a thermal energy source during other periods.

The specific heat "$C_p$" and/or the latent heat "$L$" of a material is the primary factor considered in selecting heat storage materials. Specific heat is the amount of heat required to heat a given amount of the storage material through one degree. Thus, if the storage material is heated through a temperature range of $\Delta T°$ F., then the number of BTU's stored is $C_p\Delta T$. On the other hand, latent heat is heat stored at a given temperature by a phase change. Thus, when ice at 0° C. is melted to water at 0° C., 80 calories per gram is absorbed. Likewise, when water at 0° C. freezes to ice at 0° C., the 80 calories of heat are given up to the surroundings.

The use of latent heat storage materials is gaining favor in many heat storage systems. Factors considered in their selection are: the melting point, low cost, high heat of fusion per unit weight, availability in large quantities, and simplicity of preparation. In addition, they may be non-toxic, non-flammable, non-combustible and non-corrosive. The lowest cost materials for use are large volume chemicals based on compounds of sodium, potassium, magnesium, aluminum, and iron. Preferably, the materials are in the form of salt-hydrates and their eutectics. The type of low cost compounds are chlorides, nitrates, sulfates, phosphates, carbonates and their hydrates while additives or modifiers may include borates, hydroxides and silicates.

The primary difficulty encountered in utilizing some latent heat of fusion materials, such as sodium sulfate decahydrate, is that after several cycles of melt-freeze phase transformations, some anhydrous sodium sulfate settles out. When the mixture is cooled below the freezing point again, heavy crystals of sodium sulfate on or near the bottom of the container cannot completely dissolve to crystallize as a salt-hydrate. Sodium sulfate decahydrate, that has been recycled several times, solidifies in three distinct layers; these are (a) a bottom layer of white anhydrous sodium sulfate crystals, (b) a larger intermediate layer of translucent sodium sulfate decahydrate crystals, and (c) on top, a layer of liquid saturated solution of sodium sulfate.

Various thickening agents have been included in heat storage mixtures as additives with the aim of producing a suspension in which the anhydrous salt does not settle out even after successive heating/cooling cycles, but are ineffective.

DESCRIPTION OF THE PRIOR ART

Nicholas Laing, U.S. Pat. No. 3,720,198, issued Mar. 13, 1973.

The objects of the invention are:
A. To provide a heat storage element that needs no container to prevent the escape of the heat storage substance. (Col. 1, lines 25–46) (Col. 2, lines 57–59) (Col. 2, line 65–Col. 3, line 3) (Col. 3, lines 41–55) (Col. 5, lines 31–37).
B. To provide a heat storage element that maintains an even distribution of seed crystals throughout the heat storage element. (Col. 1, line 47–Col. 2, line 15) (Col. 2, lines 19–25) (Col. 2, lines 50–56) (Col. 3, lines 3–8, lines 54–56) (Col. 4, lines 38–46) (Col. 5, lines 37–42; lines 23–25).

The process of manufacturing of Laing's patents are:
A. To produce zeolite-like body forming elements when mixed with the heat storage substance by pressure and heat in a sintering-like process (Col. 4, lines 14–30) (Col. 4, lines 33–39). This last reference describes the only detailed manufacturing process in Laing's patent. Laing suggests that 97% of a eutectic salt of light metal nitrates and 3% magnesium oxide be mixed and heated until sintered. The fact that the solubility of magnesium oxide in aqueous systems is essentially extremely small and that the melting point of magnesium oxide is 2800 degrees centigrade makes it highly unlikely that any sintering process will take place.
B. To produce organic body forming elements in the presence of the heat storage substance by melting the organic body forming element and the heat storage substance, mixing the two components, then rapidly cooling the mixture to solidify the organic body forming element. (Col. 4, lines 54–64).
C. To produce a heat storage element from a heat storage substance and a honeycomb shaped body, glass fiber mats body, or open pored hard foam body only when the heat storage substance is mixed with a gel-forming or thixotropic rendering substance. (Col. 5, lines 21–44).
D. To produce a heat storage element without a rigid body forming member wherein the storage material assumes a gel state and is contained in a plastic tube wherein said plastic tube, filled with a storage material in a gel state, is pliable. (Col. 6, lines 42–62).

None of the processes described in Laing's patent are the same as the processes described in this application. The only process mentioning a preexisting foam material that is "introduced" with a storage substance is found at (Col. 5, lines 21–44) and this reference specifically states that in such cases the storage substance is mixed with a gel-forming or thixotropic-rendering substance to avoid the escape of the storage substance in the molten state. This application teaches the use of preexisting open celled foam material imbibed with a latent heat storage substance wherein said open celled foam material prevents phase separation of the latent heat storage substance during cyclical melt-freeze conditions.

U.S. Pat. No. 2,515,298, issued to J. E. Feldman, July 18, 1950: This invention describes a body warming device which necessarily must be made of flexible material. The device involves a layer of expanded material which is preferably sponge rubber having in its interstices an inert hydrated inorganic salt which has a melting point in the neighborhood of normal human body temperature. The device is used to warm the body by first being heated above the melting point of the salt-hydrate, then put in contact with the human body to be used, for example, in the form of gloves and then, thereafter, the gloves are used until they start to stiffen as the salt-hydrate is gradually cooled below its melting point. The stiffening is an indication that the device must be reheated again for further use. The rubber foam or sponge is impregnated with the salt-hydrate by manipulation of the flexible foam after injecting or placing the hydrate inside the sponge.

SUMMARY OF THE INVENTION

The present invention is for a latent heat storage structure. The structure is of low cost, simple in making, and is capable of storing substantially more heat by way of its latent heat storage component than by way of its specific heat. One component of the structure is a foamed inorganic material of natural or synthetic origin which has substantially open pores interconnected and leading to the outside (normally called an "open celled" material).

In one process of making, a salt-hydrate or a eutectic salt is melted in a closed container. The foamed material is placed in the solution whereupon the salt solution is spontaneously imbibed, displacing the air in the open cells of the material. Thereafter, the salt-hydrate-foam composite is packaged or encapsulated with a vapor barrier material to prevent the loss of moisture from the imbibed salt by evaporation during use.

The structure comprises an open celled porous material imbibed with salt-hydrates or eutectic salts enclosed in a vapor barrier. The open celled porous material stops the separation of insoluble components which are formed when the imbibed salt-hydrate is melted. The open celled porous material includes natural rock, such as volcanic rock (Tuff) in the form of pebbles, synthetic materials, such as foamed glass, foamed concrete and foamed metal made in various shapes such as plates 1 to 5 inches thick or rods 1 to 5 inches in diameter.

OBJECTS

It is a principal object of the present invention to provide a new and improved heat storage medium utilizing a latent heat storage salt-hydrate component wherein said storage medium's heat capacity does not diminish by way of solids separation upon an indefinite number of melt-freeze phase transformations.

Another object of the invention is to provide a thermal storage medium that prevents dehydration of the latent heat storage component during heat cycling.

A further object of the invention is to provide a thermal storage medium that is operative as a heat exchange structure.

Still another object of the invention is to provide such a material that is extremely simple in process of making, that is inexpensive, that utilizes materials of low cost and in abundance, and where the heat capacity in terms of BTU's per unit weight is considerably higher than that of water or rocks.

DETAILED DESCRIPTION OF INVENTION

The present invention is directed to a structure having a high latent heat of fusion per unit weight. The structure is particularly adaptable as a storage mass for heat energy derived from solar radiation or other forms of generated heat or thermal energy. As described hereinafter, the material may be adaptable to particular configurations for energy related storage and release purposes.

Typical of the inorganic latent heat of fusion materials suitable for use in the structure are the salt-hydrates, for instance:

Calcium chloride hexahydrate: $CaCl_2 6H_2O$
Sodium carbonate decahydrate: $Na_2CO_3 10H_2O$
Disodium phosphate dodecahydrate: $Na_2HPO_4 12H_2O$
Calcium nitrate tetrahydrate: $Ca(NO_3)_2 4H_2O$
Sodium sulfate decahydrate: $Na_2SO_4 10H_2O$
Sodium thiosulfate pentahydrate: $Na_2S_2O_3 5H_2O$ and the eutectic mixtures, for instance:

$CaCl_2-MgCl_2.12H_2O$ $Mg(NO_3)_2.6H_2O-Al(NO_3)_3.9H_2O$

The ability of these materials to release and absorb thermal energy in their phase transition from liquid to solid and vice versa, is well known to those skilled in the art and further exemplification is not deemed essential to the invention.

The thermal storage structure of this invention is an inorganic latent heat storage salt-hydrate or mixture of salt-hydrates capable of storing thermal energy by way of their heat of fusion when heated through their melting point and wherein said latent heat storage component is diffused throughout an inorganic open celled hydrophillic rigid foam component characterized in that said latent heat storage salt-hydrates are constrained to exhibit non-deteriorating latent heat storage capacity by virtue of their diffusion throughout said inorganic open celled hydrophillic rigid foam component. The structure further is packaged or encapsulated with a material impervious to moisture.

More specifically, the foam preferably should be in the order of 85% open celled with the cells interconnecting and open to the surface of the foam. A material having a substantial less percentage of open cells may still be operable although perhaps not as efficiently.

The material may take several forms such as volcanic rock, more commonly called Tuff. Alternatively, and again preferably, the base material may be fabricated from such materials as foamed glass, foamed concrete, foamed metal, or foamed plaster. It is to be appreciated that the percentage of open cells will vary from material to material. In alternative constructed embodiments it was found that foamed glass and foamed concrete were particularly adaptable by preventing the settling out of any solid components of a salt-hydrate melt wherein said solid components density is greater than the density of the remaining liquid component of the melt, i.e., in this invention, when sodium sulfate decahydrate is the latent heat storage component, the foamed component prevents the settling out of any anhydrous sodium sulfate which is a solid component of a sodium sulfate decahydrate melt possessing a density greater than the remaining liquid component of the melt. In all cases these foams are inorganic, rigid, hydrophillic materials. The hydrophillic and open celled nature of the materials allows the melted salt-hydrate to wet the surface of the cells and causes the melted salt-hydrate to be drawn into the cells of the foam by capillary action, simultaneously displacing the air in the cells.

The structure resulting after the open celled foam has imbibed the melted salt-hydrate also serves as a heat exchange structure. Prior to use, the structure is encapsulated within a vapor impermeable material. Functionally, when hot air is passed over the encapsulated structure, heat is removed from the air and is transmitted to the cooler encapsulated latent heat storage material. These heat storage structures should be dimensioned in such a way that none of the imbibed salt-hydrate is substantially more than 2.5 inches from the surface of the structure in order to avoid a situation in which the heat takes an impractically long period of time to penetrate to the central part of the structure. Tuff can be prepared in the form of 1 to 5 inch pebbles while the other materials can be fabricated in 1 to 5 inch thick plates, slabs, or cylinders in order to meet this requirement. These structures can be arranged in a suitable insulated plenum through which the air to be heated or cooled is passed.

A sample of encapsulated Tuff, filled with an equal weight of sodium phosphate dodecahydrate, was heated to a temperature of 143° F., then allowed to cool to an ambient temperature of 66° F. The temperature of the specimen was monitored, as a function of time, by strapping a metallic temperature probe on one side of the sample. In the first portion of the temperature curve, up to about 14 minutes of elapsed time, a normal cooling curve was observed. The heat evolved in that time was equivalent to about 19 BTU's per pound. At this point, the exotherm of the crystallizing salt made itself evident and the rock began to heat up. After about ten minutes an equilibrium temperature of 80° F., 14 degrees above ambient, was reached. The total heat evolved by this exothermic process was 60 BTU's per pound. The outside temperature of the rock was 80° F. even though the crystallizing salt inside would be at a temperature of 94° F. The reason for this is that the internal heat must be conducted to the surface which is simultaneously being cooled by the surrounding air.

The known tendency of the salt-hydrates to supercool (remain liquid and cool below the melting point without crystallizing) is not likely to take place when the salts are placed in the porous medium. The solid surface, in intimate contact with the solution, induces crystallization by way of nucleation. However, to assure crystallization small amounts of nucleating agents, such as Borax, may be placed on the surface of the salt-hydrate filled structure before packaging or encapsulating it with a water impermeable material. The nucleating agent, in contact with the salt-hydrate near the surface of the structure, induces said salt-hydrate to crystallize, which in turn, induces crystallization throughout the salt-hydrate distributed throughout all the pores or cells of the structure because these are interconnected and open to the surface of the structure beneath the encapsulant.

Suitable foamed glass porous material for impregnation with a salt-hydrate is available commercially. The density of this foam glass is as low as 8.5 lbs. per cubic foot and a structure with 85% open cells can be fabricated. One cubic foot of this foam glass will hold about 90 lbs. of salt-hydrate. A calculation similar to that made with volcanic rock Tuff indicates that one million BTU's can be stored in 72 cubic feet of material weighing about 7100 lbs.

Table (1) below gives some values for several media which have been investigated or used for heat storage.

Table 1. Heat Storage Media.

| Material | Melting Point Degrees Fahrenheit | Specific Heat BTU's/lb. | Latent Heat BTU's/lb. at melting point | Volume or Weight To Hold 1 Million BTU's[2] | |
|---|---|---|---|---|---|
| | | | | cu.ft. | pounds |
| Water[1] | 32° | 1 | 148 | 400 | 25,000 |
| Basalt (lava rock) | — | 0.2 | 0 | 680 | 125,000 |
| Limestone | — | 0.22 | 0 | 730 | 114,000 |
| Foamed glass filled with $Na_2HPO_4 \cdot 12H_2O$ | 94° | 0.3 | 96 | 72 | 10,146 |

[1] Water has a substantial latent heat at its melting point but the operating temperature is, of course, impractical. Storage of heat in water utilizes its specific heat.
[2] In the case of specific heat, based on $\Delta T = 40$ degrees.

Another porous material with an open cell structure adaptable for use is foamed aluminum. A foamed aluminum filled with a salt-hydrate or a mixture of salt-hydrates is particularly useful because of its high heat conductivity. Foamed aluminum can be prepared with a density as low as 12 lbs./cu. ft. and with an open cell content as high as 90%. Open celled porous polymeric materials are difficult, if not impossible, to fill with salt hydrate by spontaneous imbibing because the surface of the pores in the organic materials are hydrophobic.

The impregnated material may be encapsulated in an aqueous based tough water impervious coating. Encapsulating the structure prevents dehydration of salt-hydrate while the structure is exposed to air streams in use. Materials which can be used are spackling compounds based on Portland cements and Gypsum products. A particularly useful material for encapsulation of the natural porous rock, for example, consists of:

Gypsum 0.70 parts by weight, Lime 0.007 parts by weight, Sodium citrate 0.004 parts by weight, Water 0.28 parts by weight and Gum arabic 0.007 parts by weight.

This slurry may be modified by the addition of a poly (vinyl acetate) latex, depending on the degree of viscosity required.

With foamed aluminum or foamed glass, encapsulation may be had by bonding aluminum foil over the surface, or by sealing in a tight fitting container.

One use of filled porous foamed material is in a storage wall system as described in "Solar Energy Thermal Processes", p. 332 by John A. Duffie and William A. Beckman, John Wiley and Sons, 1974. In this application, one wall of a house, facing the sun, consists of glass, a space and a wall of blackened heat-storage material (in this case, for example, the filled foamed aluminum painted black with a heat-resistant paint). During exposure to the sun the wall of foamed material will be filled with heat and during the night air circulating over or through the heat storage medium is used to heat the house.

The structure described herein is encapsulated in material impervious to moisture. Examples of such materials are: metals, i.e., galvanized steel and aluminum; metal foils of aluminum or steel; plasters, i.e., high density polyethylene, polypropylene, nylon and polystyrene; and composites of plastic film and metal foil such as a laminate of polypropylene film, aluminum foil, and polyester film such as polyethylene terephthalate.

It is to be appreciated that other uses for these materials which can be fabricated in various shapes, such as with the foamed glass, for other purposes are within the scope of the invention.

I claim:

1. A thermal storage structure comprising an inorganic latent heat storage component capable of storing thermal energy by way of its heat of fusion when heated at its melting point and wherein said latent heat storage component is essentially uniformly distributed throughout an inorganic open celled hydrophillic rigid foam component characterized in that said latent heat storage component is constrained to exhibit non-deteriorating latent heat storage capacity by virtue of its distribution throughout said inorganic open celled hydrophillic rigid foam component and wherein said structure is encapsulated with a material impervious to moisture.

2. The thermal storage structure of claim 1 wherein said inorganic latent heat storage component is an inorganic salt-hydrate.

3. The thermal storage structure of claim 1 wherein said inorganic latent heat storage component is a mixture of inorganic salt-hydrates.

4. The thermal storage structure of claim 1 wherein said inorganic open celled hydrophillic rigid foam component has up to 85% open interconnected cells.

5. The thermal storage structure of claim 1 wherein said open celled hydrophillic rigid foam component is an open celled rock formation.

6. The thermal storage structure of claim 1 wherein said open celled hydrophillic rigid foam component is an open celled foam concrete.

7. The thermal storage structure of claim 1 wherein said inorganic open celled hydrophillic rigid foam component is an open celled foamed glass.

8. The thermal storage structure of claim 1 wherein said inorganic open celled hydrophillic rigid foam component is an open celled foamed metal.

9. The thermal storage structure of claim 1 wherein said material impervious to moisture is a metal foil.

10. The thermal storage structure of claim 1 wherein said material impervious to moisture is a sealed container.

11. The thermal storage structure of claim 1 wherein said material impervious to moisture is a plastic material.

12. The thermal storage structure of claim 5 wherein said open celled foam rock formation is an open celled foam volcanic rock material.

13. The thermal storage structure of claim 8 wherein said open celled foamed metal is an open celled foamed aluminum.

14. The process of making a thermal storage structure comprising:
 (a) Saturating an inorganic open celled hydrophillic rigid foam component with a melted inorganic latent heat storage component;
 (b) Encapsulating or packaging the structure in a material impervious to moisture.

15. The process of claim 14 wherein said inorganic latent heat storage component is an inorganic salt-hydrate.

16. The process of claim 14 wherein said latent heat storage component is a mixture of inorganic salt-hydrates.

17. The process of claim 14 wherein said inorganic open celled hydrophillic rigid foam component is an open celled foam rock formation.

18. The process of claim 14 wherein said inorganic open celled hydrophillic rigid foam component is an open celled foamed concrete.

19. The process of claim 14 wherein said inorganic open celled hydrophillic rigid foam component is an open celled foamed metal.

20. The process of claim 14 wherein said material impervious to moisture is a metal foil.

21. The process of claim 14 wherein said material impervious to moisture is a sealed container.

22. The process of claim 14 wherein said material impervious to moisture is a plastic material.

23. The process of claim 17 wherein said open celled foamed rock formation is an open celled foam volcanic rock material.

24. The process of claim 19 wherein said open celled foamed metal is an open celled foamed aluminum.

* * * * *